United States Patent
Suzuki et al.

(10) Patent No.: US 8,630,749 B2
(45) Date of Patent: Jan. 14, 2014

(54) VEHICLE CONTROL SYSTEM, ELECTRONIC CONTROL DEVICE, AND COMMUNICATION METHOD

(75) Inventors: Takayuki Suzuki, Nagoya (JP); Hidemitsu Kawashima, Seto (JP)

(73) Assignee: Omron Automotive Electronics Co., Ltd., Aichi (JP)

( * ) Notice: Subject to any disclaimer, the term of this patent is extended or adjusted under 35 U.S.C. 154(b) by 0 days.

(21) Appl. No.: 13/543,477

(22) Filed: Jul. 6, 2012

(65) Prior Publication Data

US 2013/0013129 A1    Jan. 10, 2013

(30) Foreign Application Priority Data

Jul. 7, 2011    (JP) ................................. 2011-151293

(51) Int. Cl.
*G06F 7/00* (2006.01)
(52) U.S. Cl.
USPC ........................................................... 701/2
(58) Field of Classification Search
USPC ..................................... 701/2, 537, 538, 541
See application file for complete search history.

(56) References Cited

U.S. PATENT DOCUMENTS

| | | | |
|---|---|---|---|
| 6,629,032 B2 | 9/2003 | Akiyama | |
| 6,922,545 B2 | 7/2005 | Nakatsugawa | |
| 7,305,284 B2 | 12/2007 | Teshima et al. | |
| 7,444,117 B2 | 10/2008 | Katayama et al. | |
| 2001/0014585 A1 | 8/2001 | Nakatsugawa | |
| 2003/0018422 A1 | 1/2003 | Akiyama | |
| 2003/0043793 A1 | 3/2003 | Reinold et al. | |
| 2004/0097263 A1 | 5/2004 | Katayama et al. | |
| 2005/0031344 A1* | 2/2005 | Sato et al. ........................ 398/42 |
| 2006/0030268 A1 | 2/2006 | Teshima et al. | |
| 2009/0091185 A1 | 4/2009 | Konno | |

FOREIGN PATENT DOCUMENTS

| | | |
|---|---|---|
| DE | 10342581 A1 | 4/2004 |
| EP | 1384626 A1 | 1/2004 |
| JP | 2003-101557 A | 4/2003 |
| JP | 2003-152737 A | 5/2003 |
| JP | 2006-45908 A | 2/2006 |
| JP | 2009-167638 A | 7/2009 |

OTHER PUBLICATIONS

Office Action for German Application No. 10 2012 106 125.4 dated Nov. 8, 2012, with English translation thereof (13 pages).
Patent Abstracts of Japan for Japanese Publication No. 2003-152737, published May 23, 2003 (1 page).
Patent Abstracts of Japan for Japanese Publication No. 2009-167638, published Jul. 30, 2009 (1 page).
Office Action Issued in U.S. Appl. No. 13/543,490, Dated Apr. 11, 2013 (19 Pages).

* cited by examiner

*Primary Examiner* — Kim T Nguyen
(74) *Attorney, Agent, or Firm* — Osha Liang LLP

(57) ABSTRACT

A vehicle control system has a radio wave transmitting body that transmits information using a radio signal, a first electronic control device that receives the radio signal from the radio wave transmitting body, and a second electronic control device that receives the radio signal from the radio wave transmitting body. The first electronic control device includes a first transmitting/receiving unit that transmits and receives the radio signal, a first information acquisition unit that acquires the information, which is transmitted from the radio wave transmitting body, from the radio signal received by the first transmitting/receiving unit, and an information repeater that passes the information acquired by the first information acquisition unit to the second electronic control device by transmitting the radio signal from the first transmitting/receiving unit.

9 Claims, 7 Drawing Sheets

VEHICLE CONTROL SYSTEM, ELECTRONIC CONTROL DEVICE, AND COMMUNICATION METHOD

TECHNICAL FIELD

The present invention relates to a vehicle control system, an electronic control device, and a communication method, particularly to a vehicle control system including a plurality of electronic control devices that are provided on a vehicle and a portable device that transmits information using a radio signal, an electronic control device, and a communication method.

RELATED ART

Nowadays, a vehicle is controlled by many electronic control devices (hereinafter also referred to as "ECUs") including engine control, such as a fuel injection amount, vehicle driving control, such as a transmission, braking control, such as an ABS (Antilock Brake System), and vehicle-body control, such as a door, a power window, and an air-bag. Communication between the ECUs and sharing of information are required to properly control each unit of the vehicle, and the ECUs are connected to each other through a network to construct an in-vehicle network system.

However, the ECUs are disposed in many places in the vehicle, and the number of wire harnesses, such as an electric power line connecting a battery and each ECU and a communication line (such as a CAN and a LIN) connecting the ECUs, is increased to enlarge a wiring space, which results in that the wiring is hardly performed in the vehicle. An increase in weight of the wire harness may also occur. Therefore, there is well known a configuration in which information is exchanged between the ECUs in the vehicle without wiring the communication line.

For example, Japanese Unexamined Patent Publication No. 2003-101557 discloses a vehicle communication system in order to transmit and receive the information among various electric devices mounted on the vehicle without wiring many communication lines for various networks in the vehicle. In the vehicle communication system including one or a plurality of transmitting/receiving circuits, a transmitting/receiving unit that can transmit and receive various pieces of information through the power supply line is provided in each ECU mounted on the vehicle, and each transmitting/receiving unit can conduct multiple communication in each type of the information to be transmitted and received between the ECUs using different transmission frequencies.

Japanese Unexamined Patent Publication No. 2003-152737 discloses a vehicle control system in order to be able to securely conduct radio communication between a plurality of electronic control devices without wiring a cable. In the vehicle control system, three ECUs are mounted in each area where the direct communication can wirelessly be conducted, three repeater devices are arrayed on a center line of the vehicle such that the radio communication can be conducted between the areas, and the repeater devices pass the information with a set transmission level.

Conventionally, there is well known a keyless entry system or a passive entry system, in which a lock/unlock state of the door is controlled by bidirectional communication between a portable device (FOB) carried by a user and the ECU mounted on the vehicle. There is also well known an in-vehicle device remote control system that gives permission for the ignition of the engine.

For example, Japanese Unexamined Patent Publication No. 2006-45908 discloses an in-vehicle device remote control system in order that a desirable sensing area is always ensured even if the sensing area that is an access range of a request signal transmitted from a transmitter in a vehicle interior varies in each vehicle or changes according to a radio wave environment in which the vehicle is placed. The in-vehicle device remote control system is installed in an outer edge position of a desirable vehicle-interior sensing area, includes a reference LF receiver that receives a signal transmitted from a vehicle-interior LF transmitter, and adjusts a signal transmission output level of the vehicle-interior LF transmitter based on a reception result of the reference LF receiver.

However, in the related art, because the portable device conducts communication with the specific ECU, it is necessary to provide a plurality of antennae connected to the specific ECU around the vehicle in order to ensure communication quality against a noise or a barrier. There is no technology in which both the communication between the portable device and the ECU and the communication between the ECUs are simultaneously used while combined.

SUMMARY

One or more embodiments of the present invention accurately delivers the information transmitted from the radio wave transmitting body, such as the portable device, to the electronic control device (ECU), which controls the device of the vehicle, without providing many antennae in the electronic control device in order to transmit and receive the information using the radio signal.

In accordance with one or more embodiments of the present invention, a vehicle control system includes: a radio wave transmitting body that transmits information using a radio signal; and a first electronic control device and a second electronic control device, which receive the radio signal from the radio wave transmitting body, wherein the first electronic control device includes: a first transmitting/receiving unit that transmits and receives the radio signal; a first information acquisition unit that acquires the information, which is transmitted from the radio wave transmitting body, from the radio signal received by the first transmitting/receiving unit; and an information repeater that passes the information acquired by the first information acquisition unit to the second electronic control device by transmitting the radio signal from the first transmitting/receiving unit, and the second electronic control device includes: a second transmitting/receiving unit that receives the radio signal from the radio wave transmitting body and the first electronic control device; a second information acquisition unit that acquires the information, which is transmitted from the radio wave transmitting body, from the radio signal received by the second transmitting/receiving unit; a third information acquisition unit that acquires the information, which is passed by the first electronic control device, from the radio signal received by the second transmitting/receiving unit; and a controller that controls a device of a vehicle based on the information acquired by the second information acquisition unit or the third information acquisition unit.

The information transmitted from the radio wave transmitting body is received by the plurality of electronic control devices provided in the vehicle, the electronic control devices wirelessly transfer the information to each other, and the information transmitted from the radio wave transmitting body is delivered to the electronic control device that controls the device of the vehicle. Therefore, the vehicle control system in which the reception accuracy of the information transmitted from the radio wave transmitting body is enhanced can be provided.

In a vehicle control system according to one or more embodiments of the present invention, the vehicle includes the plurality of first electronic control devices that conduct radio communication with each other, and the first electronic control device further includes a determination unit that determines whether a content of the radio signal received by the first transmitting/receiving unit is the information transmitted from the radio wave transmitting body, a content relating to processing of the own first electronic control device, or a content that does not relate to the own first electronic control device.

Therefore, the flexible vehicle control system, in which the reception accuracy of the information transmitted from the radio wave transmitting body is high by repeating various pieces of information transmitted from the radio wave transmitting body, can be provided.

In a vehicle control system according to one or more embodiments of the present invention, the second electronic control device further includes a reply request signal generator that transmits a reply request signal to the radio wave transmitting body, the controller controls the device of the vehicle based on the information when the second information acquisition unit or the third information acquisition unit acquires the information within a predetermined time after the reply request signal generator transmits the reply request signal.

Therefore, the vehicle control system, in which the reception accuracy of the information transmitted from the radio wave transmitting body is enhanced, can be provided in the passive entry system.

According to one or more embodiments of the present invention, an electronic control device is provided, wherein a second electronic control device is included in a vehicle along with a first electronic control device that has a repeating function, the second electronic control device controlling a device of the vehicle based on information transmitted from a radio wave transmitting body, the information is passed from the radio wave transmitting body to the second electronic control device by transmitting and receiving a radio signal between the second electronic control device and the radio wave transmitting body in the repeating function, and the second electronic control device includes: a transmitting/receiving unit that transmits and receives the radio signal to and from the radio wave transmitting body and the first electronic control device; a first information acquisition unit that acquires the information, which is transmitted from the radio wave transmitting body and received by the second electronic control device, from the radio signal received by the transmitting/receiving unit; a second information acquisition unit that acquires the information, which is transmitted from the radio wave transmitting body, received by the first electronic control device, and passed to the second electronic control device, from the radio signal received by the transmitting/receiving unit; and a controller that controls the device of the vehicle based on the information acquired by the first information acquisition unit or the second information acquisition unit.

Therefore, the electronic control device that controls the device of the vehicle based on the information transmitted from the radio wave transmitting body can be provided. In the electronic control device, the information transmitted from the radio wave transmitting body is received by the plurality of electronic control devices provided in the vehicle, the electronic control devices wirelessly transfer the information to each other, and the information transmitted from the radio wave transmitting body is delivered to the electronic control device that controls the device of the vehicle, which enhances the reception accuracy of the information transmitted from the radio wave transmitting body.

In a vehicle control device according to one or more embodiments of the present invention, the second electronic control device further includes a reply request signal generator that transmits a reply request signal to the radio wave transmitting body, the controller controls the device of the vehicle based on the information when the second information acquisition unit or the third information acquisition unit acquires the information within a predetermined time after the reply request signal generator transmits the reply request signal.

Therefore, the electronic control device that controls the device of the vehicle based on the information from the radio wave transmitting body with the enhanced reception accuracy of the information transmitted from the radio wave transmitting body is enhanced can be provided in a passive entry system.

According to one or more embodiments of the present invention, an electronic control device is provided, wherein a plurality of first electronic control devices are included in a vehicle together with a second electronic control device, the first electronic control device controlling a device of the vehicle based on information transmitted from a radio wave transmitting body, and the first electronic control device includes: a transmitting/receiving unit that transmits and receives a radio signal to and from the radio wave transmitting body, the other first electronic control device, and the second electronic control device; a determination unit that determines whether a content of the radio signal received by the transmitting/receiving unit is the information transmitted from the radio wave transmitting body, a content relating to processing of the own first electronic control device, or a content that does not relate to the own first electronic control device; an information acquisition unit that acquires the information, which is transmitted from the radio wave transmitting body, from the determination unit; and an information repeater that passes the information acquired by the information acquisition unit to the second electronic control device by transmitting the radio signal from the transmitting/receiving unit.

Therefore, the electronic control device that passes various pieces of information transmitted from the radio wave transmitting body can be provided in order that the plurality of electronic control devices provided in the vehicle flexibly transfer the information to each other in the wireless manner.

According to one or more embodiments of the present invention, a communication method is provided, in a vehicle including a plurality of electronic control devices that conduct radio communication with each other, between a radio wave transmitting body that transmits information in order to control a device provided in the vehicle using a radio signal and a second electronic control device that controls the device based on the information in the plurality of electronic control devices, wherein a first electronic control device in the plurality of electronic control devices passes the information included in the radio signal to the second electronic control device when receiving the radio signal transmitted from the radio wave transmitting body, and the second electronic control device receives the radio signal including the information, which is transmitted from the radio wave transmitting body and directly received by the second electronic control device, or the information, which is transmitted from the radio wave transmitting body, received by the first electronic control device, and passed to the second electronic control device.

The information transmitted from the radio wave transmitting body is received by the plurality of electronic control devices provided in the vehicle, the electronic control devices wirelessly transfer the information to each other, and the information transmitted from the radio wave transmitting body is delivered to the electronic control device that controls the device of the vehicle. Therefore, the communication method in which the reception accuracy of the information transmitted from the radio wave transmitting body is enhanced can be provided.

In a communication method according to one or more embodiments of the present invention, the second electronic control device transmits a reply request signal to the radio wave transmitting body using the radio signal, and the radio wave transmitting body sends back the radio signal including the information to the reply request signal.

Therefore, the communication method in which the reception accuracy of the information transmitted from the radio wave transmitting body is enhanced can be provided in the passive entry system.

In a communication method according to one or more embodiments of the present invention, the second electronic control device transmits to the first electronic control device an asking signal asking whether the radio signal transmitted from the radio wave transmitting body is received, and the first electronic control device sends back the radio signal including the information in response to the asking signal when receiving the radio signal transmitted from the radio wave transmitting body within a predetermined time.

Therefore, the communication method, in which the electronic control devices securely transfer the information in the wireless manner to enhance the reception accuracy of the information transmitted from the radio wave transmitting body, can be provided.

As described above, according to one or more embodiments of the invention, there can be provided the vehicle control system, the electronic control device, and the communication method, in which the information transmitted from the radio wave transmitting body is received by the plurality of electronic control devices provided in the vehicle, the electronic control devices wirelessly transfer the information to each other, and the information transmitted from the radio wave transmitting body is delivered to the electronic control device, which controls the device of the vehicle, to enhance the reception accuracy of the information transmitted from the radio wave transmitting body.

As a result, the communication between the radio wave transmitting body and the electronic control device can be conducted with high accuracy, even if the antenna is not separately provided to transmit and receive the information using the radio signal. Additionally it is not necessary to dispose a wire harness to transmit and receive the information between the electronic control devices. Therefore, a margin is generated in a space in the vehicle.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
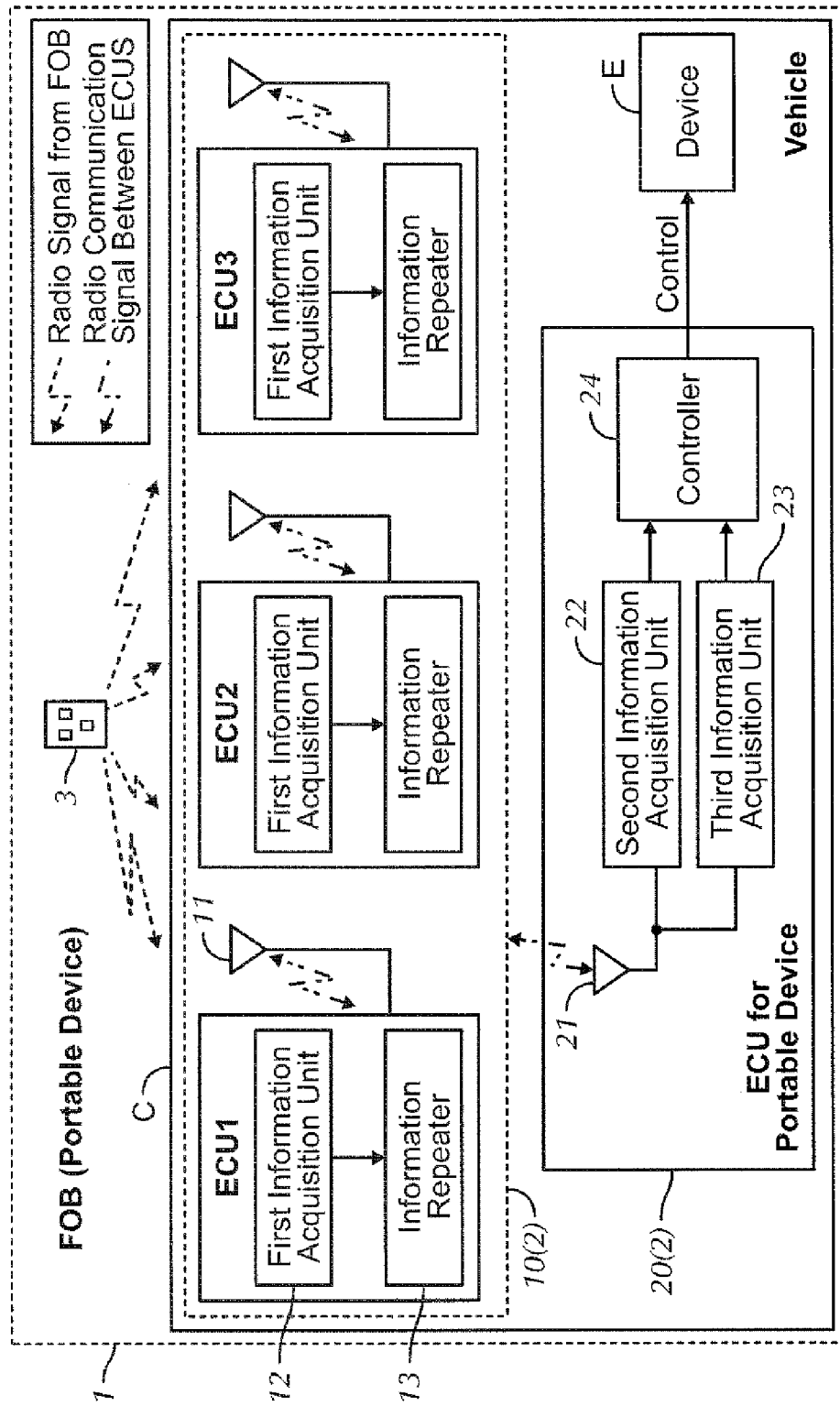
FIG. 1 is a block diagram illustrating a vehicle control system according to a first embodiment of the invention.

FIG. 1 is a block diagram illustrating a vehicle control system 1 according to a first embodiment of the invention. The vehicle control system 1 includes an electronic control device 2 that is provided in a vehicle C and a portable device 3 (also referred to as an FOB) that is the radio wave transmitting body, which transmits information using a radio signal. The portable device 3 is not limited to a product possessed by a user of the vehicle. For example, the portable device 3 may be a communicator mounted on the other vehicle or a communicator set up in a facility, such as a building. In the following description, the radio wave transmitting body includes a general communicator that controls the vehicle by conducting radio communication with an in-vehicle electronic control device.

The vehicle C includes the plurality of electronic control devices 2, and some of or all the electronic control devices 2 have a communication function of conducting radio communication with the portable device 3. The electronic control device 2 having the communication function includes a second electronic control device 20 (in FIG. 1, ECU for portable device) and a first electronic control device 10. The second electronic control device 20 controls a device E that is a control target mounted on the vehicle C. Although the first electronic control device 10 does not directly control the device E, the first electronic control device 10 passes the radio signal including control information, which is transmitted from the portable device 3, to the second electronic control device 20.

The information transmitted from the portable device 3 is information controlling the device E, for example, lock/unlock control information in the case in which the device E is the vehicle door, and engine start/stop control information in the case in which the device E is the engine. In the case in which the radio wave transmitting body is the communicator mounted on the other vehicle, for example, the information transmitted from the radio wave transmitting body is data that is exchanged between the vehicles or control information processing the data. In the case in which the radio wave transmitting body is the communicator set up in the facility, such as the building, the information transmitted from the radio wave transmitting body is data or a program, which is used in the electronic control device of the vehicle.

The first electronic control device 10 includes a first transmitting/receiving unit 11 that transmits and receives the radio signal, a first information acquisition unit 12 that acquires information, which is transmitted from the portable device 3, from the radio signal received by the first transmitting/receiving unit 11, and an information repeater 13 that passes the information acquired by the first information acquisition unit 12 to the second electronic control device 20 by transmitting the radio signal from the first transmitting/receiving unit 11. In the first embodiment, the vehicle C includes three first electronic control devices 10. However, there is no particular limitation to the number of first electronic control devices 10 in one vehicle C.

Typically the first transmitting/receiving unit 11 is an antenna. The first transmitting/receiving unit 11 transmits and receives the radio signal to and from the portable device 3 and the other electronic control device 2 having the communication function. The first transmitting/receiving unit 11 may be used only to transmit and receive the radio signal to and from the portable device 3 that is the radio wave transmitting body, or the first transmitting/receiving unit 11 may conduct communication with the communicator that is the other radio wave transmitting body. One first transmitting/receiving unit 11 is provided in one first electronic control device 10. Alternatively, a plurality of first transmitting/receiving units 11 may be provided in order to improve sensitivity of the transmission and reception. As to a usable bandwidth, generally an RF band is used from the portable device 3 to the first transmitting/receiving unit 11 and an LF band is used from the first transmitting/receiving unit 11 to the portable device 3. However, there is no particular limitation to the usable bandwidth.

The first information acquisition unit 12 acquires the coded control information in the radio signal transmitted from the portable device 3. When the first transmitting/receiving unit 11 receives the radio signal, the first information acquisition unit 12 checks whether a content of the radio signal is the radio signal transmitted from the portable device 3, and acquires the checked information. At this point, the first information acquisition unit 12 may make the check based on a code signal, which is provided to the radio signal and unique to the portable device 3, make the check from the whole content of the radio signal, or make the check based on a signal characteristic, such as a frequency of the received radio signal.

The information repeater 13 passes the information acquired by the first information acquisition unit 12 to the second electronic control device 20 by transmitting the radio signal from the first transmitting/receiving unit 11. The information repeater 13 passes signal information, which is acquired by the first information acquisition unit 12 and transmitted from the portable device 3, to the second electronic control device 20 by transmitting the radio signal from the first transmitting/receiving unit 11. At this point, the information repeater 13 may directly transmit the signal information, which is received from the portable device 3 by the first transmitting/receiving unit 11, while providing a unique code indicating the information repeater 13 to the signal information. The information repeater 13 may code a content obtained from the first information acquisition unit 12 again, transmit the coded content while providing a code signal unique to the portable device 3 and a code signal unique to the information repeater 13 to the coded content.

The second electronic control device 20 includes a second transmitting/receiving unit 21, a second information acquisition unit 22, a third information acquisition unit 23, and a controller 24. The second transmitting/receiving unit 21 transmits and receives the radio signal to and from the portable device 3 and the first electronic control device 10. The second information acquisition unit 22 acquires the information, which is transmitted from the portable device 3, from the radio signal received by the second transmitting/receiving unit 21. The third information acquisition unit 23 acquires the information, which is passed by the first electronic control device 10, from the radio signal received by the second transmitting/receiving unit 21. The controller 24 controls the device E of the vehicle C based on the information acquired by the second information acquisition unit 22 or the third information acquisition unit 23.

In the first embodiment, one second electronic control device 20 is provided in one vehicle C. Alternatively, a plurality of second electronic control devices 20 may be provided in one device E, or one or a plurality of second electronic control devices 20 may be provided in the other device E (not illustrated).

Typically the first transmitting/receiving unit 21 is an antenna. The first transmitting/receiving unit 21 transmits and receives the radio signal to and from the portable device 3 and the first electronic control device 10. The first transmitting/receiving unit 21 may be used only to transmit and receive the radio signal to and from the portable device 3 that is the radio wave transmitting body, or the first transmitting/receiving unit 21 may conduct communication with the communicator that is the other radio wave transmitting body. One first transmitting/receiving unit 21 is provided in one second electronic control device 20. Alternatively, a plurality of first transmitting/receiving units 21 may be provided in order to improve the sensitivity of the transmission and reception. As to the usable bandwidth, generally the RF band is used from the portable device 3 to the first transmitting/receiving unit 21 and the LF band is used from the first transmitting/receiving unit 11 to the portable device 3. However, there is no particular limitation to the usable bandwidth.

In the second electronic control device 20, the second information acquisition unit 22 acquires the information, which is transmitted from the portable device 3, from the radio signal when the radio signal received by the first transmitting/receiving unit 21 is the radio signal transmitted from the portable device 3. The third information acquisition unit 23 acquires the information passed by the first electronic control device 10 from the radio signal when the radio signal received by the first transmitting/receiving unit 21 is the radio signal transmitted from the first electronic control device 10.

The controller 24 controls the device E of the vehicle C based on the control information, which is originally transmitted from the portable device 3 and acquired by the second information acquisition unit 22 or the third information acquisition unit 23. Thus, in the vehicle control system 1 of the first embodiment, the controller 24 of the second electronic control device 20 can control the device E of the vehicle C based on the information, which is directly received from the portable device 3 and acquired by the second information acquisition unit 22, or the information acquired by the third information acquisition unit 23 through the information repeater 13 of the first electronic control device 10.

As a result, in the vehicle control system 1, the information transmitted from the portable device 3 is received by the plurality of electronic control devices 2 provided in the vehicle C, and the electronic control devices 2 wirelessly transfer the information to each other to deliver the information transmitted from the portable device 3 to the second electronic control device 20, which allows the enhancement of the reception accuracy of the information transmitted from the portable device 3. Accordingly, the communication between the portable device 3 and the second electronic control device 20 that controls the device E can be conducted with high accuracy without providing separately an antenna. Because the wire harness is not required between the electronic control devices 2, there is a margin in wiring of the vehicle C, a degree of freedom can be increased in designing and manufacturing the vehicle C, and weight reduction of the vehicle body is achieved.

When both the second electronic control device 20 that controls the device E and the other first electronic control device 10 receive the radio signal from the portable device 3 to pass the information, which is transmitted from the portable device 3, from the first electronic control device 10 to the second electronic control device 20, the second electronic control device 20 may perform the control based on the information directly received from the portable device 3 by the first transmitting/receiving unit 21. Compared with the radio signal through the first electronic control device 10, the radio signal directly received from the portable device 3 reaches the second electronic control device 20 faster, and the directly-received radio signal has higher reliability from the viewpoint of signal quality. However, the invention is not limited to the first embodiment. For example, the control may be performed using the radio signal that is determined by majority vote among radio signals passed by many first electronic control devices 10.

The second electronic control device 20 is provided in the vehicle C together with the first electronic control device 10 having the repeating function, and includes the transmitting/receiving unit, the information acquisition unit, and the controller in order to control the device E of the vehicle C based on the information transmitted from the portable device 3. The transmitting/receiving unit transmits and receives the radio signal to and from the portable device 3 and the first electronic control device 10. The two kinds of the information acquisition unit includes the first information acquisition unit that acquires the information, which is transmitted from the portable device 3 and received by the second electronic control device 20, from the radio signal received by the transmitting/receiving unit and the second information acquisition unit that acquires the information, which is transmitted from the portable device 3, received by the first electronic control device 10, and passed to the second electronic control device 20 by the first electronic control device 10, from the radio signal received by the transmitting/receiving unit. The controller controls the device E of the vehicle C based on the information acquired by the first information acquisition unit or the second information acquisition unit. As used herein, the repeating function means a function in which the information is passed from the portable device 3 to the second electronic control device 20 by transmitting and receiving the radio signal between the second electronic control device 20 and the portable device 3.

Therefore, the electronic control device that controls the device of the vehicle based on the information from the portable device 3 can be provided. At this point, the information transmitted from the portable device 3 is received by the plurality of electronic control devices provided in the vehicle C, the electronic control devices wirelessly transfer the information to each other to deliver the information transmitted from the portable device 3 to the electronic control device that controls the device of the vehicle, which allows the enhancement of the reception accuracy of the information transmitted from the portable device 3.

Figure 2:
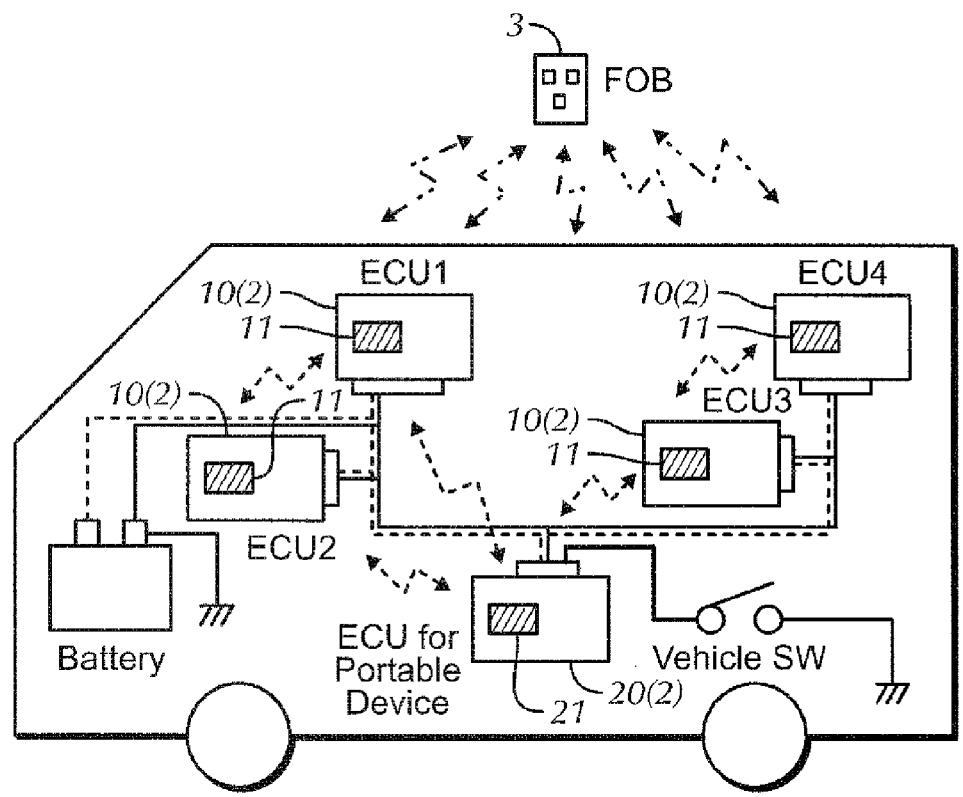
FIG. 2 is a view illustrating the case in which the vehicle control system of the first embodiment is mounted on a vehicle.

FIG. 2 is a view illustrating the case in which the vehicle control system of the first embodiment is actually mounted on the vehicle. Referring to FIG. 2, one electronic control device 20 (second electronic control device, ECU for portable device in FIG. 2) and four first electronic control devices 10 are provided together with a battery. Each electronic control device is connected to the battery and the power supply line to receive the electric power.

Figure 7:
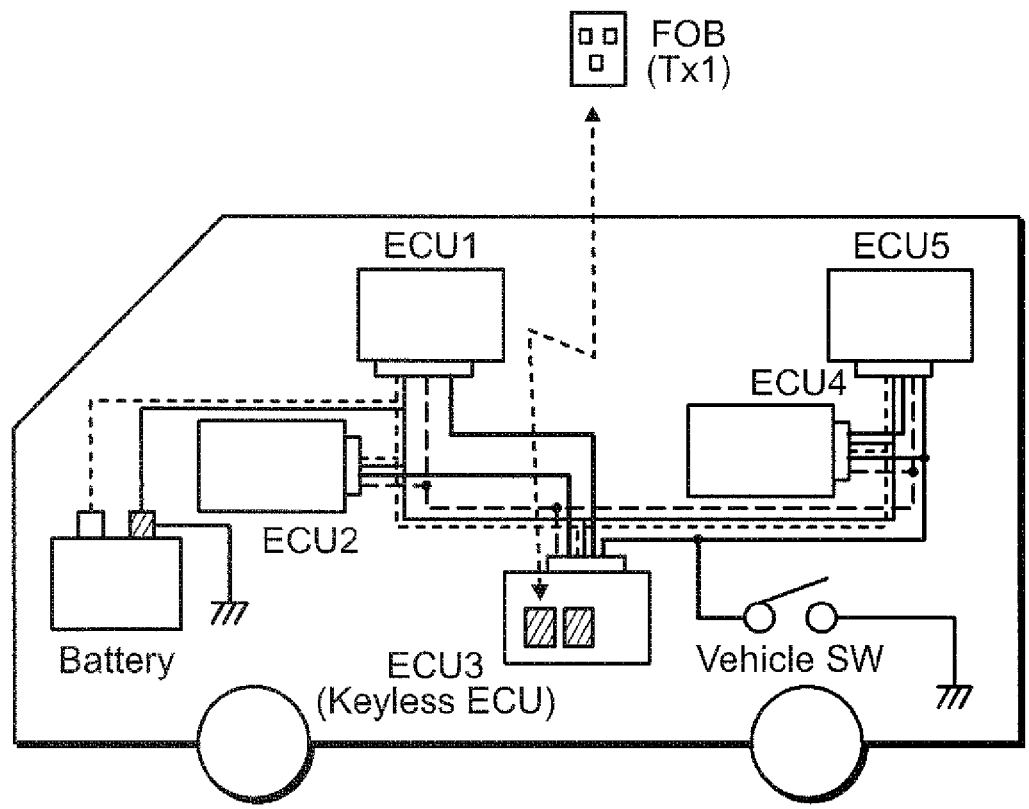
FIG. 7 is a view illustrating the case in which a vehicle control system of the related art is mounted on the vehicle.

The comparison of the vehicle control system of the first embodiment to that of the related art will be described with reference to FIG. 7. FIG. 7 is a view illustrating the case in which the vehicle control system of the related art is mounted on the vehicle. Similarly to the vehicle control system in FIG. 2, one electronic control device (in FIG. 7, keyless ECU), corresponding to the electronic control device 20, which controls the device and four electronic control devices are provided together with a battery. Each electronic control device is connected to the battery and the power supply line to receive the electric power. A wire harness for a CAN (Controller Area Network) in which communication is conducted among ECUs and a wire harness for a LIN (Local Interconnect Network) in which local communication is conducted are disposed.

In the related art, many wire harnesses are required. On the other hand, the wire harness, which is required in the related art, is rarely required in the first embodiment, because the radio communication is conducted between the second electronic control device 20 and the first electronic control device 10. Therefore, there is a margin in wiring of the vehicle C, a degree of freedom can be increased in designing and manufacturing the vehicle, and weight reduction of the vehicle is achieved.

In FIG. 7, the FOB (portable device) can conduct communication only with the keyless ECU, but the FOB cannot conduct communication with the other ECU to transfer the information to the other ECU. Accordingly, the communication accuracy (reception accuracy) between the FOB and the keyless ECU is degraded when the FOB is located in a position in which the radio signal hardly reaches the keyless ECU of the vehicle. For example, it is necessary to install the antenna in another place in the vehicle to enhance the communication accuracy with the FOB. On the other hand, in the first embodiment in FIG. 2, the FOB conducts radio communication with not only the second electronic control device 20 but also the first electronic control devices 10 disposed in places of the vehicle C, and can deliver the necessary information to the second electronic control device 20. Therefore, the transmission and reception of the radio signal hardly depends on the position of the FOB compared with the related art. It is not necessary to separately provide the antenna in the vehicle. Accordingly, in the vehicle control system 1, the reception accuracy of the information transmitted from the portable device 3 can be enhanced to deliver the information to the second electronic control device 20.

Figure 3:
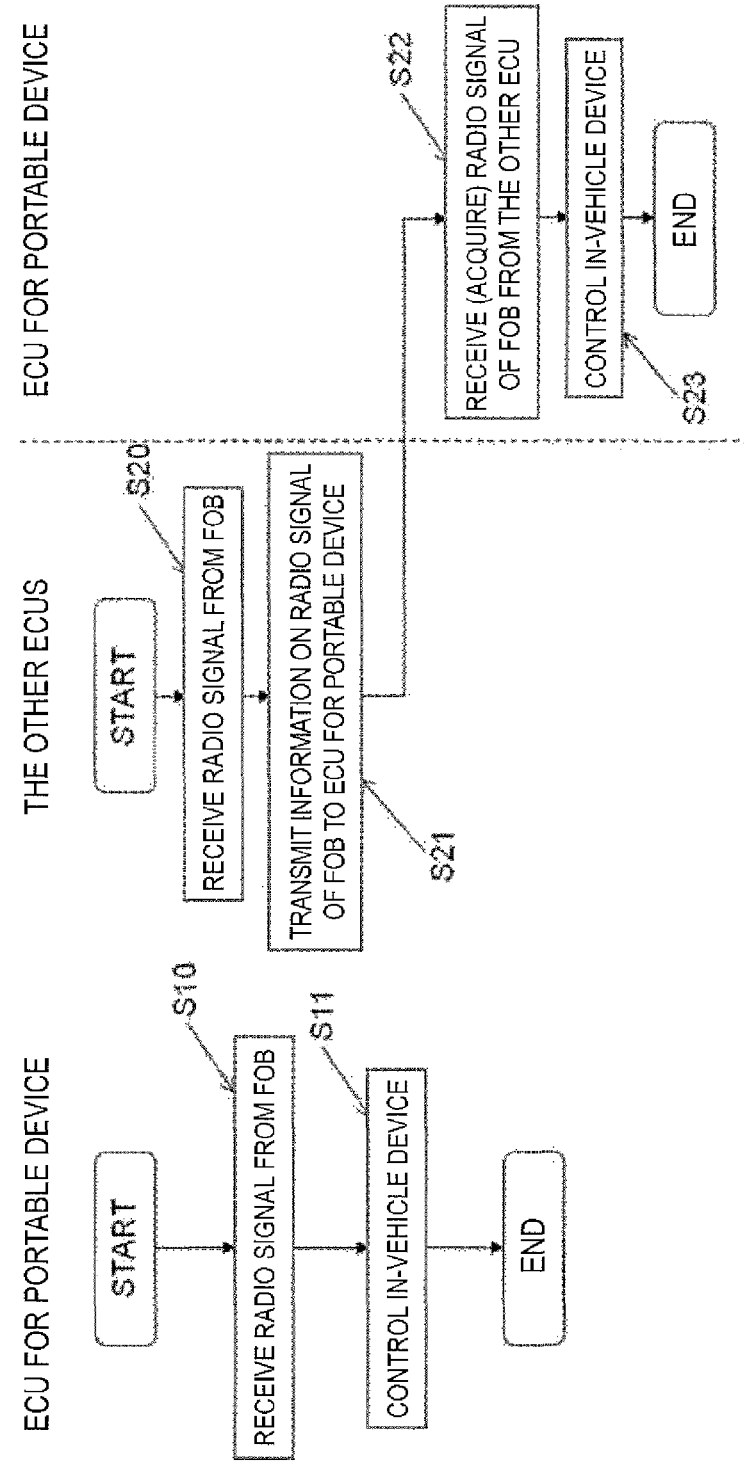
FIG. 3 is a flowchart in the vehicle control system of the first embodiment.

FIG. 3 is a flowchart in the vehicle control system of the first embodiment. Step is abbreviated to S. When receiving the radio signal from the FOB in S10, the second electronic control device 20 (in FIGS. 1 and 2, ECU for portable device) controls the in-vehicle device based on the information included in the radio signal in S11. On the other hand, when receiving the radio signal from the FOB in S20, the first electronic control device 10 (in FIGS. 1 and 2, ECU except ECU for portable device) transmits the information included in the radio signal of the FOB to the second electronic control device 20 (ECU for portable device) using the radio signal in S21. The second electronic control device 20 receives the radio signal transmitted from the first electronic control device 10 to acquire the information from the radio signal in S22, and controls the in-vehicle device based on the information in S23.

In the vehicle C including the first electronic control devices 10 that are of the plurality of electronic control devices and the second electronic control device 20, which conduct radio communication with each other, Steps in FIG. 3 are a control method in which the second electronic control device 20 controls the device E based on the information, which is transmitted from the portable device 3 to control the device E provided in the vehicle C. More specifically, the second electronic control device 20 controls the device E based on the information, which is transmitted from the portable device 3 and directly received by the second electronic control device 20, or the information that is transmitted from the portable device 3, received by the first electronic control device 10, and passed to the second electronic control device 20 by the first electronic control device 10.

For example, in a case where the device E is the vehicle door, the information transmitted from the portable device 3 is control information locking/unlocking the door and a control method in which the second electronic control device 20 locks/unlocks the door. That is, the second electronic control device 20 controls the lock/unlock of the door based on the control information locking/unlocking the door, which is transmitted from the portable device 3 and directly received by the second electronic control device 20, or the control information that is transmitted from the portable device 3, received by the first electronic control device 10, and passed to the second electronic control device 20 by the first electronic control device 10.

In the vehicle C including the first electronic control devices 10 that are of the plurality of electronic control devices and the second electronic control device 20, which conduct radio communication with each other, Steps in FIG. 3 are a communication method between the portable device 3 that transmits the information controlling the device E of the vehicle C using the radio signal and the second electronic control device 20 that controls the device E based on the information. More specifically, when the first electronic control device 10 receives the radio signal transmitted from the portable device 3, the first electronic control device 10 passes the information included in the radio signal to the second electronic control device 20, the second electronic control device 20 receives the radio signal including the information, which is transmitted from the portable device 3 and directly received by the second electronic control device 20, or the information that is transmitted from the portable device 3, received by the first electronic control device 10, and passed to the second electronic control device 20 by the first electronic control device 10.

For example, in the case in which the device E is the engine, the information transmitted from the portable device 3 is control information starting/stopping the engine. Accordingly, Steps in FIG. 3 are the communication method between the portable device 3 that transmits the control information controlling the start/stop of the engine and the second electronic control device 20 that controls the engine based on the control information in the vehicle C. More specifically, when receiving the radio signal transmitted from the portable device 3, the first electronic control device 10 passes the engine start/stop control information included in the radio signal to the second electronic control device 20. The second electronic control device 20 receives the radio signal including the engine start/stop control information, which is transmitted from the portable device 3 and directly received by the second electronic control device 20, or the engine start/stop control information that is transmitted from the portable device 3, received by the first electronic control device 10, and passed to the second electronic control device 20 by the first electronic control device 10.

Accordingly, the communication method in which the reception accuracy of the information transmitted from the portable device 3 is enhanced can be provided. At this point, the information transmitted from the portable device 3 is received by the plurality of electronic control devices provided in the vehicle C, the electronic control devices wirelessly transfer the information to each other to deliver the information transmitted from the portable device 3 to the electronic control device that controls the device of the vehicle, which allows the enhancement of the reception accuracy of the information transmitted from the portable device 3.

Second Embodiment

Figure 4:
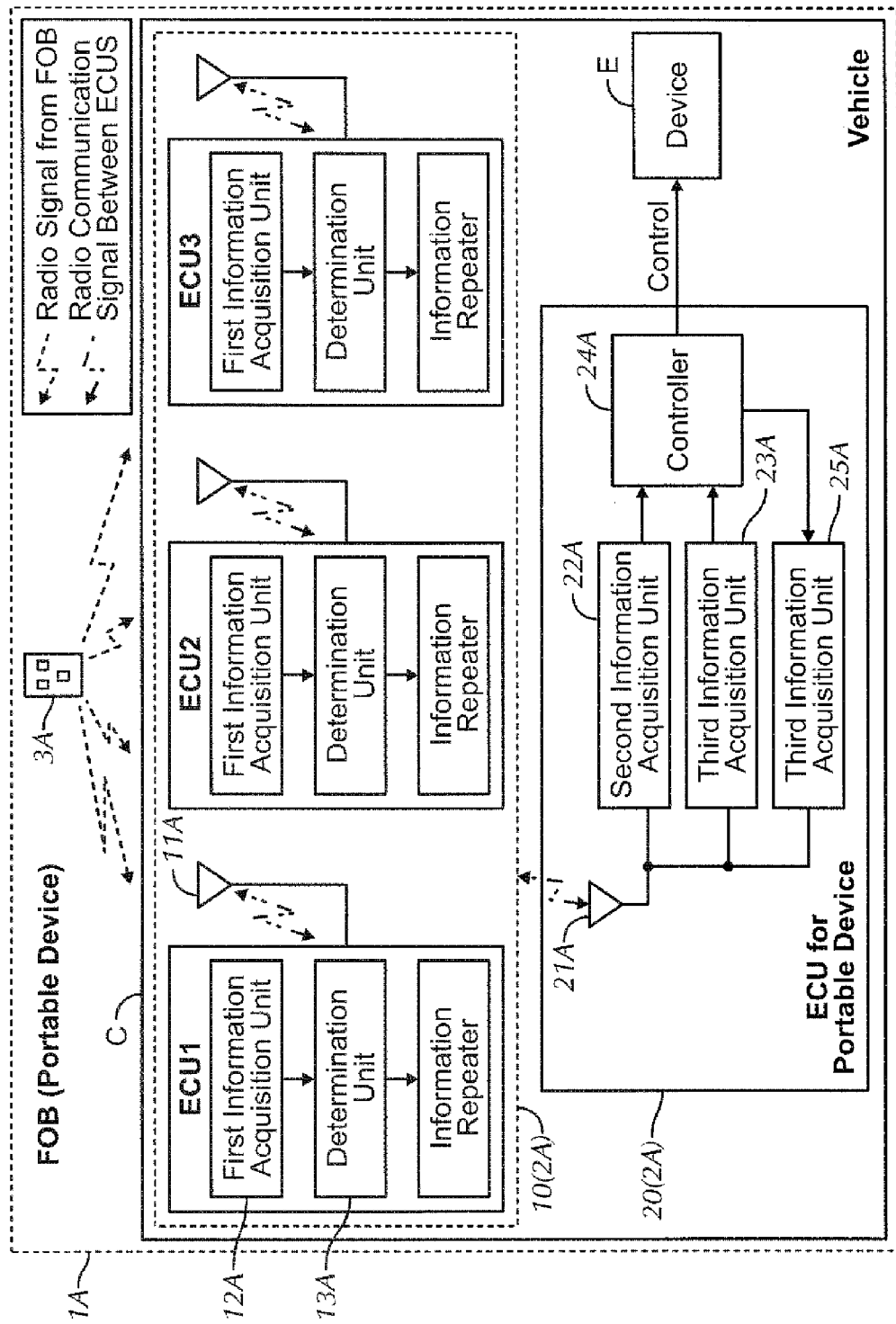
FIG. 4 is a block diagram illustrating a vehicle control system according to a second embodiment of the invention.

FIG. 4 is a block diagram illustrating a vehicle control system 1A according to a second embodiment of the invention. Hereinafter, only a part different from that of the first embodiment will be described. In the vehicle control system 1A, a plurality of first electronic control devices 10A are provided in the vehicle C, and conduct communication with each other using the radio signal. The first electronic control device 10A includes a determination unit 14A that determines whether the radio signal received by a first transmitting/receiving unit 12A has information transmitted from a portable device 3A, a content relating to processing of the own first electronic control device 10A, or a content that does not relate to the own first electronic control device 10A.

The determination unit 14A checks a source host of the radio signal, which is received by the first transmitting/receiving unit 12A and acquired by the first information acquisition unit. At this point for example, the source host may be checked by the unique code provided to the radio signal or the whole content of the radio signal, or the source host may be checked based on the signal characteristic, such as the frequency of the received radio signal.

When being able to check that the source host of the radio signal is the portable device 3A, the determination unit 14A determines that the acquired information is the information to be passed, and transmits the information to the second electronic control device 20A through the information repeater 13A. When being able to check that the source host of the radio signal is, for example, the other first electronic control device 10A previously determined, the determination unit 14A determines that the acquired information is the information on processing relating to the own first electronic control device 10A, and uses the information for the own first electronic control device 10A. When being able to check that the source host of the radio signal is the previously-determined device that does not relate to the own determination unit 14A, or when the source host of the radio signal cannot be checked, the determination unit 14A determines that the acquired information is the information that does not relate to the own determination unit 14A, and performs no piece of processing to the information included in the received radio signal.

Various pieces of information transmitted from the portable device 3A are passed and transmitted to the second electronic control device 20. Therefore, the flexible vehicle control system having the high reception accuracy of the information transmitted from the portable device 3A can be provided. For example, it is assumed that the second electronic control device 20 is the electronic control device that control the lock/unlock of the door while one of the first electronic control devices 10 is the electronic control device that controls the start/stop of the engine. When the radio signal is transmitted from the portable device 3A in order to lock the door, the first electronic control device 10A passes the control information to the second electronic control device 20A. On the other hand, when the radio signal is transmitted from the portable device 3A in order to start the engine, the electronic control device that controls the lock/unlock of the door passes the received information as the first electronic control device 10, the electronic control device that controls the start/stop of the engine acts as the second electronic control device 20, and uses the information of the radio signal in order to control the start of the engine.

In the vehicle control system 1A, the second electronic control device 20A includes a reply request signal generator 25A that transmits a reply request signal to the portable device 3A. When the second information acquisition unit 22A or the third information acquisition unit 23A acquires the information from the portable device 3A within a predetermined time after the reply request signal generator 25A transmits the reply request signal, a controller 24A controls the device E of the vehicle C based on the information. Therefore, even if the vehicle control system 1A is a passive entry system, the reception accuracy of the information transmitted from the portable device 3A can be enhanced. As used herein, the passive entry system means a system in which an operation with the portable device is not required. For example, in the passive entry system, the door is unlocked when a user holds a handle of the door even if the portable device is put in a bag of the user.

When the reply request signal generator 25A of the second electronic control device 20A transmits the reply request signal to the portable device 3A, usually the portable device 3A that receives the reply request signal sends a reply to the second electronic control device 20A that transmits the reply request signal within a given time (for example, several milliseconds to several seconds) in response to the reply request. When receiving no reply within a predetermined time, the second electronic control device 20A determines that the portable device 3A is not located in a communicable area, and does not unlock the door. When receiving the reply from the portable device 3A within the predetermined time, the second electronic control device 20A unlocks the door under a certain condition (for example, the user touches a door sensor).

The first electronic control device 10A is the electronic control device that includes the transmitting/receiving unit, the determination unit, the information acquisition unit, and the information repeater in order to control the device E of the vehicle C based on the information transmitted from the portable device 3A. The plurality of first electronic control devices 10A are provided in the vehicle C together with the second electronic control device 20A. The transmitting/receiving unit transmits and receives the radio signal to and from the portable device 3A, the other first electronic control device 10A, and the second electronic control device 20A. The determination unit determines whether the radio signal received by the transmitting/receiving unit has information transmitted from the portable device 3A, the content relating to the processing of the own first electronic control device 10A, or the content that does not relate to the own first electronic control device 10A. The information acquisition unit acquires the information, which is transmitted from the portable device 3A, from the determination unit. The information repeater passes the information acquired by the information acquisition unit to the second electronic control device 20A by transmitting the radio signal from the transmitting/receiving unit. Because the plurality of electronic control devices provided in the vehicle flexibly exchange the information with each other in the wireless manner, the electronic control device that passes various pieces of information transmitted from the portable device can be provided.

Figure 5:
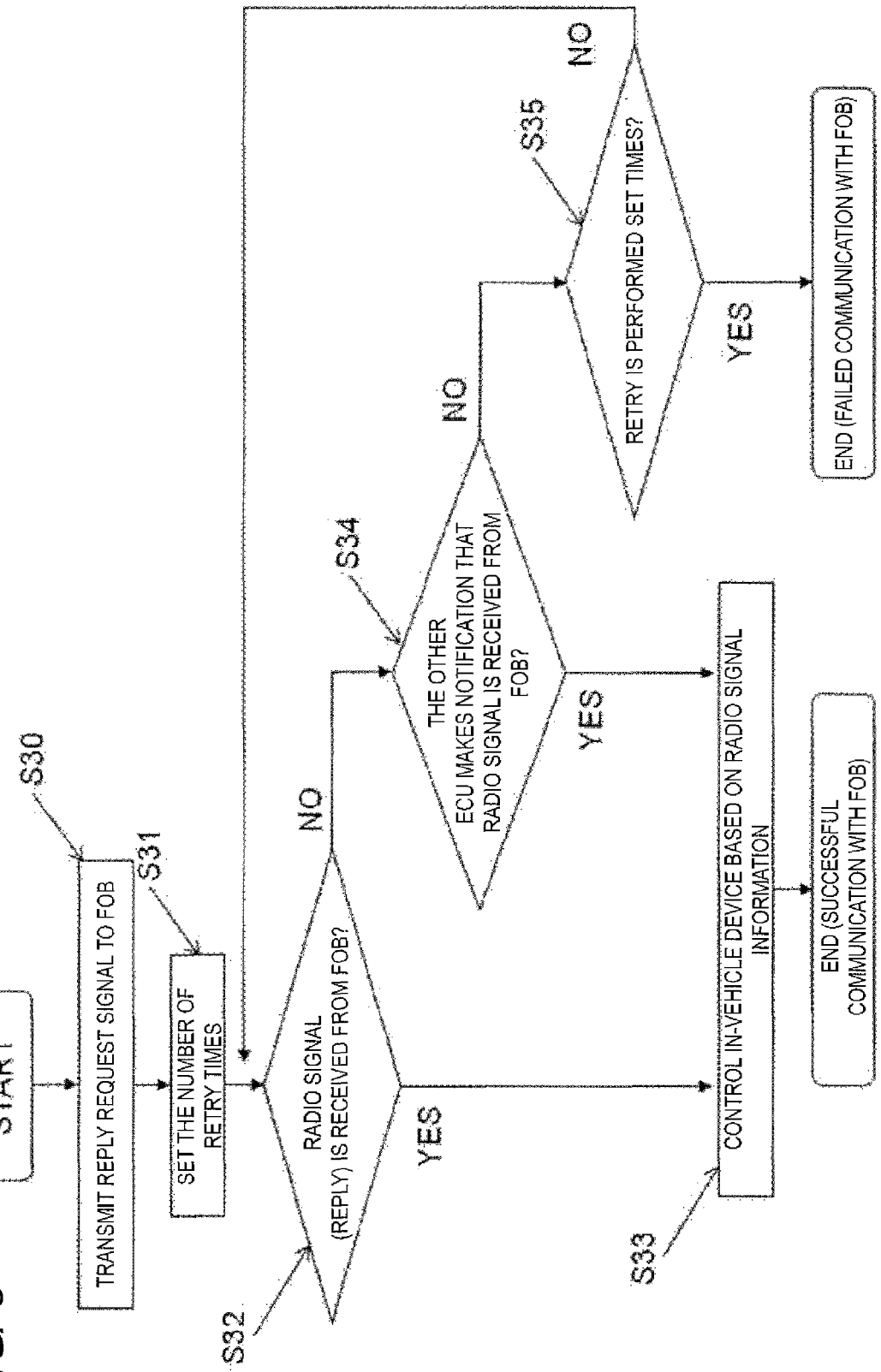
FIG. 5 is a flowchart in the vehicle control system of the second embodiment.

FIG. 5 is a flowchart relating to a passive entry of the second embodiment. In S30, the reply request signal generator 25A of the second electronic control device 20A transmits the reply request signal to the portable device 3A. In S31, the second electronic control device 20A sets how many retry times the reply request signal is transmitted after the first transmission. In S32, the second electronic control device 20A checks whether the second transmitting/receiving unit 21A receives the radio signal (reply) from the portable device 3A. When the second transmitting/receiving unit 21A receives the radio signal, the controller 24A controls the device E based on the information included in the received radio signal in S33.

When the second transmitting/receiving unit 21A does not receive the radio signal within a predetermined time, the second electronic control device 20A checks whether the first electronic control device 10A makes a notification that the radio signal (reply) is received from the portable device 3A in S34. When the first electronic control device 10A makes the notification, the controller 24A controls the device E based on the information included in the received radio signal in S33.

When the first electronic control device 10A does not make the notification, in S35, the second electronic control device 20A checks whether the retry is performed the times set in S31. The flow returns to S32 when the retry is not performed the set times. When the retry is performed the set times, the determination that the communication with the portable device 3A cannot be conducted is made, and the flow is ended without controlling the device E.

Steps in FIG. 5 express the communication method, in which second electronic control device 20A transmits the reply request signal to the portable device 3A using the radio signal and the portable device 3A sends back the radio signal in response to the reply request signal. Therefore, the communication method in which the reception accuracy of the information transmitted from the portable device 3A can be provided in the passive entry system.

Figure 6:
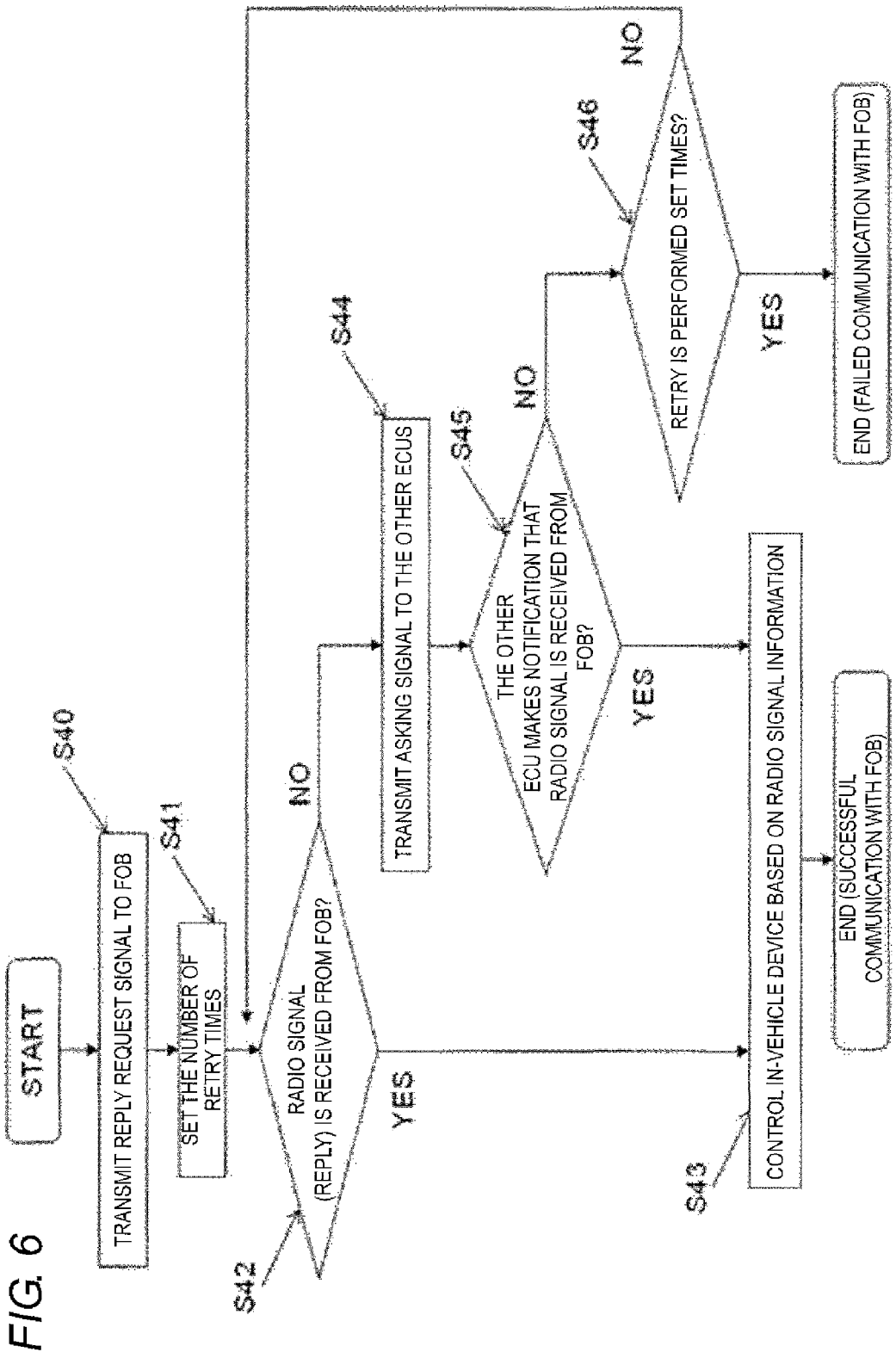
FIG. 6 is a flowchart in a vehicle control system according to a modification of the second embodiment.

FIG. 6 is a flowchart relating to a passive entry in a modification of the second embodiment. In S40, the reply request signal generator 25A of the second electronic control device 20A transmits the reply request signal to the portable device 3A. In S41, the second electronic control device 20A sets how many retry times the reply request signal is transmitted after the first transmission. In S42, the second electronic control device 20A checks whether the second transmitting/receiving unit 21A receives the radio signal (reply) from the portable device 3A. When the second transmitting/receiving unit 21A receives the radio signal, the controller 24A controls the device E based on the information included in the received radio signal in S43.

When the second transmitting/receiving unit 21A does not receive the radio signal within a predetermined time, the reply request signal generator 25A of the second electronic control device 20A transmits a signal asking whether the first electronic control device 10A receives the radio signal (reply) from the portable device 3A to the first electronic control device 10A in S44. In S45, the second electronic control device 20A checks whether the first electronic control device 10A makes a notification that the radio signal (reply) is received from the portable device 3A. When the first electronic control device 10A makes the notification, the controller 24A controls the device E based on the information included in the received radio signal in S43.

When the first electronic control device 10A does not make the notification, the second electronic control device 20A checks whether the retry is performed the set times in S46. The flow returns to S42 when the retry is not performed the set times. When the retry is performed the set times, the determination that the communication with the portable device 3A cannot be conducted is made, and the flow is ended without controlling the device E.

Steps in FIG. 6 express the communication method, in which the second electronic control device 20A transmits to the first electronic control device 10A the asking signal asking whether the radio signal transmitted from the portable device 3A is received and the first electronic control device 10A sends back the radio signal in response to the asking signal when the radio signal transmitted from the portable device 3A is received within the predetermined time. Therefore, the communication method in which the reception accuracy of the information transmitted from the portable device 3A that is the radio wave transmitting body is enhanced such that the electronic control devices securely transfer the information to each other in the wireless manner can be provided.

The invention is not limited to the above embodiments, and various changes and modifications can be made without departing from the scope of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle control system comprising:
    a radio wave transmitting body that transmits information using a radio signal;
    a first electronic control device that receives the radio signal from the radio wave transmitting body; and
    a second electronic control device that receives the radio signal from the radio wave transmitting body,
    wherein the first electronic control device includes:
        a first transmitting/receiving unit that transmits and receives the radio signal;
        a first information acquisition unit that acquires the information, which is transmitted from the radio wave transmitting body, from the radio signal received by the first transmitting/receiving unit;
        a determination unit that determines whether a content of the radio signal received by the first transmitting/receiving unit is the information transmitted from the radio wave transmitting body, a content relating to processing of the first electronic control device, or a content that does not relate to the first electronic control device;
        an information repeater that passes the information acquired by the first information acquisition unit to the second electronic control device by transmitting the radio signal from the first transmitting/receiving unit, and
    wherein the second electronic control device includes:
        a second transmitting/receiving unit that receives the radio signal from the radio wave transmitting body and the first electronic control device;
        a second information acquisition unit that acquires the information, which is transmitted from the radio wave transmitting body, from the radio signal received by the second transmitting/receiving unit;
        a third information acquisition unit that acquires the information, which is passed by the first electronic control device, from the radio signal received by the second transmitting/receiving unit; and
        a controller that controls a device of a vehicle based on the information acquired by the second information acquisition unit or the third information acquisition unit.

2. The vehicle control system according to claim 1,
wherein the vehicle includes a plurality of the first electronic control devices that conduct radio communication with each other.

3. The vehicle control system according to claim 2,
wherein the second electronic control device further includes a reply request signal generator that transmits a reply request signal to the radio wave transmitting body, and
wherein the controller controls the device of the vehicle based on the information when the second information acquisition unit or the third information acquisition unit acquires the information within a predetermined time after the reply request signal generator transmits the reply request signal.

4. The vehicle control system according to claim 1,
wherein the second electronic control device further includes a reply request signal generator that transmits a reply request signal to the radio wave transmitting body, and
wherein the controller controls the device of the vehicle based on the information when the second information acquisition unit or the third information acquisition unit acquires the information within a predetermined time after the reply request signal generator transmits the reply request signal.

5. An electronic control device, comprising:
a first electronic control device that has a repeating function disposed in a vehicle; and
a second electronic control device disposed in the vehicle that controls a device of the vehicle based on information transmitted from a radio wave transmitting body,
wherein the information is passed from the radio wave transmitting body to the second electronic control device by transmitting and receiving a radio signal between the second electronic control device and the radio wave transmitting body in the repeating function,
wherein the second electronic control device includes:
    a transmitting/receiving unit that transmits and receives the radio signal to and from the radio wave transmitting body and the first electronic control device;
    a first information acquisition unit that acquires the information, which is transmitted from the radio wave transmitting body and received by the second electronic control device, from the radio signal received by the transmitting/receiving unit;
    a second information acquisition unit that acquires the information, which is transmitted from the radio wave transmitting body, received by the first electronic control device, and passed to the second electronic control device, from the radio signal received by the transmitting/receiving unit; and
    a controller that controls the device of the vehicle based on the information acquired by the first information acquisition unit or the second information acquisition unit,
wherein the second electronic control device further includes a reply request signal generator that transmits a reply request signal to the radio wave transmitting body, and
wherein the controller controls the device of the vehicle based on the information when the first information acquisition unit or the second information acquisition unit acquires the information within a predetermined time after the reply request signal generator transmits the reply request signal.

6. An electronic control device comprising:
a plurality of first electronic control devices that control a device of a vehicle based on information transmitted from a radio wave transmitting body; and
a second electronic control device disposed in the vehicle,
wherein each of the plurality of first electronic control devices includes:
 a transmitting/receiving unit that transmits and receives a radio signal to and from the radio wave transmitting body, another of the plurality of first electronic control devices, and the second electronic control device;
 a determination unit that determines whether a content of the radio signal received by the transmitting/receiving unit is the information transmitted from the radio wave transmitting body, a content relating to processing of the own first electronic control device, or a content that does not relate to the first electronic control device;
 an information acquisition unit that acquires the information, which is transmitted from the radio wave transmitting body, from the determination unit; and
 an information repeater that passes the information acquired by the information acquisition unit to the second electronic control device by transmitting the radio signal from the transmitting/receiving unit.

7. A communication method in a vehicle comprising:
conducting radio communication between a plurality of electronic control devices,
conducting radio communication between a radio wave transmitting body that transmits information in order to control a device provided in the vehicle using a radio signal and a second electronic control device that controls the device based on the information in the plurality of electronic control devices,
passing the information included in the radio signal to the second electronic control device via a first electronic control device when receiving the radio signal transmitted from the radio wave transmitting body,
receiving via the second electronic control device the radio signal including the information, which is transmitted from the radio wave transmitting body and directly received by the second electronic control device, or the information, which is transmitted from the radio wave transmitting body, received by the first electronic control device, and passed to the second electronic control device,
transmitting via the second electronic control device a reply request signal to the radio wave transmitting body using the radio signal, and
sending back via the radio wave transmitting body the radio signal including the information to the reply request signal.

8. The communication method according to claim 7, further comprising:
transmitting via the second electronic control device to the first electronic control device an asking signal asking whether the radio signal transmitted from the radio wave transmitting body is received, and
sending back via the first electronic control device the radio signal including the information in response to the asking signal when receiving the radio signal transmitted from the radio wave transmitting body within a predetermined time.

9. The communication method according to claim 7, further comprising:
transmitting via the second electronic control device to the first electronic control device an asking signal asking whether the radio signal transmitted from the radio wave transmitting body is received, and
sending back via the first electronic control device the radio signal including the information in response to the asking signal when receiving the radio signal transmitted from the radio wave transmitting body within a predetermined time.

* * * * *